United States Patent [19]

Kondo et al.

[11] 4,173,152

[45] Nov. 6, 1979

[54] CONTINUOUSLY VARIABLE SPEED CONVERTER FOR COOPERATIVE USE WITH A FLUID PUMP

[75] Inventors: Yukio Kondo, Toyota; Minoru Kawabata, Aichi; Mikio Suzuki, Hekinan, all of Japan

[73] Assignees: Toyoda-Koki Kabushiki-Kaisha; Toyota Jidosha Kogyo Kabushiki Kaisha, both of Aichi, Japan

[21] Appl. No.: 843,673

[22] Filed: Oct. 19, 1977

[30] Foreign Application Priority Data

Oct. 22, 1976 [JP] Japan .................................. 51-127650

[51] Int. Cl.² ..................... F16H 15/00; F16H 15/40; F16H 17/02
[52] U.S. Cl. ........................................ 74/190; 74/198; 74/200; 417/223
[58] Field of Search ................. 74/198, 199, 190, 200, 74/201, 796, 196, 206; 417/223

[56] References Cited

U.S. PATENT DOCUMENTS

| | | | |
|---|---|---|---|
| 1,979,170 | 10/1934 | Nardone | 74/200 |
| 2,535,028 | 12/1950 | Arter | 74/796 |
| 3,155,040 | 11/1964 | Shurts et al. | 417/223 |
| 3,184,024 | 5/1965 | Aschauer | 417/223 |
| 3,229,538 | 1/1966 | Schottler | 74/198 |
| 3,237,468 | 3/1966 | Schottler | 74/198 |
| 3,253,548 | 5/1966 | Zeigler et al. | 417/440 |
| 3,745,844 | 7/1973 | Schottler | 74/198 |
| 3,996,807 | 12/1976 | Adams | 74/200 |

FOREIGN PATENT DOCUMENTS

498701 5/1928 Fed. Rep. of Germany ............. 74/796
356792 10/1961 Switzerland ............................... 74/200

OTHER PUBLICATIONS

Article, "Spherical Friction Type—Kopp's Continuously Variable Speed Converter" Japanese Technical Journal, Machine Design, vol. 10, No. 12, Nov. 1966, pp. 13 to 18.

*Primary Examiner*—Samuel Scott
*Assistant Examiner*—William R. Henderson
*Attorney, Agent, or Firm*—Oblon, Fisher, Spivak, McClelland & Maier

[57] ABSTRACT

A continuously variable speed converter is provided wherein a plurality of balls are interposed between a pair of friction discs for transmitting rotation of an input shaft to an output shaft connected with a fluid pump. A speed change mechanism is arranged to tilt the rotational axis of each of the balls in each plane, including the axis of the input shaft, to thereby change the output-/input speed ratio. Disposed within a main housing carrying the input and output shafts is the fluid pump, which also serves as a pressuring means responsive to fluid delivered by itself so as to apply to the output shaft a thrust force corresponding to the pressure of the fluid, so that efficient power transmission without slippage may be provided between the friction discs and the balls.

13 Claims, 7 Drawing Figures

CONTINUOUSLY VARIABLE SPEED CONVERTER FOR COOPERATIVE USE WITH A FLUID PUMP

BACKGROUND OF THE INVENTION

1. Field of the Invention

The present invention relates to a continuously variable speed converter and, more particularly, to such a converter of the friction type for cooperative use with a fluid pump driven by an engine of a motor vehicle.

2. Description of the Prior Art

In a continuously variable speed converter known heretofore, as shown in FIG. 1, a pair of friction discs 4 and 5 are carried respectively on axially aligned input and output shafts 1 and 2 and, at guide ways 4a and 5a formed respectively thereon, are in contact with power-transmission balls 3, the rotational axis of each of which is angularly adjustable. Further, a pressuring ring 8 is keyed on each of the shafts 1 and 2 to define between itself and the associated disc 4 or 5 a plurality of circumferentially continued rhomboid grooves 7, in each of which a pressuring ball 6 is contained. These grooves 7 and balls 6 constitute a pressuring device, which serves to automatically adjust the contact pressure between the associated discs 4 and 5 and the power-transmission balls 3. Namely, when rotational torque which corresponds to the load on the output shaft 2 acts on the pressuring device thereof, the pressuring balls 6 ride up on the slopes of the grooves 7, generating a thrust force based upon such wedge action and, in consequence, the associated discs 4 and 5 pressure the balls 3 to thereby adjust the contact pressure therebetween.

In the speed converter, the rotational torque acting on the input shaft 1 becomes larger than that acting on the output shaft 2 when the output/input speed ratio is more than 1, while rotational torque acting on the output shaft 2 becomes larger than that acting on the input shaft 1 when the speed ratio is less than 1, and in order to generate thrust force corresponding to the larger rotational torque, therefore, such a pressuring device has to be provided on each of the input and output shafts 1 and 2. This undesirably makes the construction complicated and invites increases of manufacturing costs because of the difficulty in machining the rhomboid grooves. In addition, since the slopes of the rhomboid grooves 7 suffer from wear by the action of great thrust force, problems in maintenance remain unsolved.

SUMMARY OF THE INVENTION

It is therefore a primary object of the present invention to provide an improved speed converter incorporating a pressuring device which is simple in construction, is reliable in operation and is freed from notable functional deterioration caused by wear.

Another object of the invention is to provide an improved speed converter in which contact pressure of friction engagement portions for power transmission is automatically adjusted by a sole pressuring device in adaptation to load acting on an output shaft.

Yet another object of the present invention is to provide an improved speed converter of the character set forth above, capable of cooperative use with a fluid pump and of generating contact pressure corresponding to load on the pump.

Briefly, these and other objects are achieved by the present invention through the provision of a continuously variable speed converter for cooperative use with a fluid pump which comprises a main housing, an input shaft rotatably carried in the main housing, an output shaft rotatably carried in the main housing in axial alignment with the input shaft and drivingly connected with the fluid pump to operate the same, a pair of friction discs respectively provided on the input and output shafts, a plurality of balls held in contact with the friction discs for power transmission therebetween, and holding and adjusting means for rotatably holding the plurality of balls and for angularly tilting the rotational axis of each of the balls in each plane, including the axis of the input shaft, so as to adjust the output/input speed ratio.

The speed converter further comprises pressuring means for applying on one of the input and output shafts a thrust force corresponding to the pressure of fluid delivered from the pump, whereby contact pressure between the friction discs and the balls can be adjusted in adaptation to load acting on the fluid pump.

BRIEF DESCRIPTION OF THE DRAWINGS

Various other objects, features and attendant advantages of the present invention will be more fully appreciated as the same becomes better understood from the following detailed description of preferred embodiments when considered in connection with the accompanying drawings, in which.

DETAILED DESCRIPTION OF PREFERRED EMBODIMENTS

Figure 1:
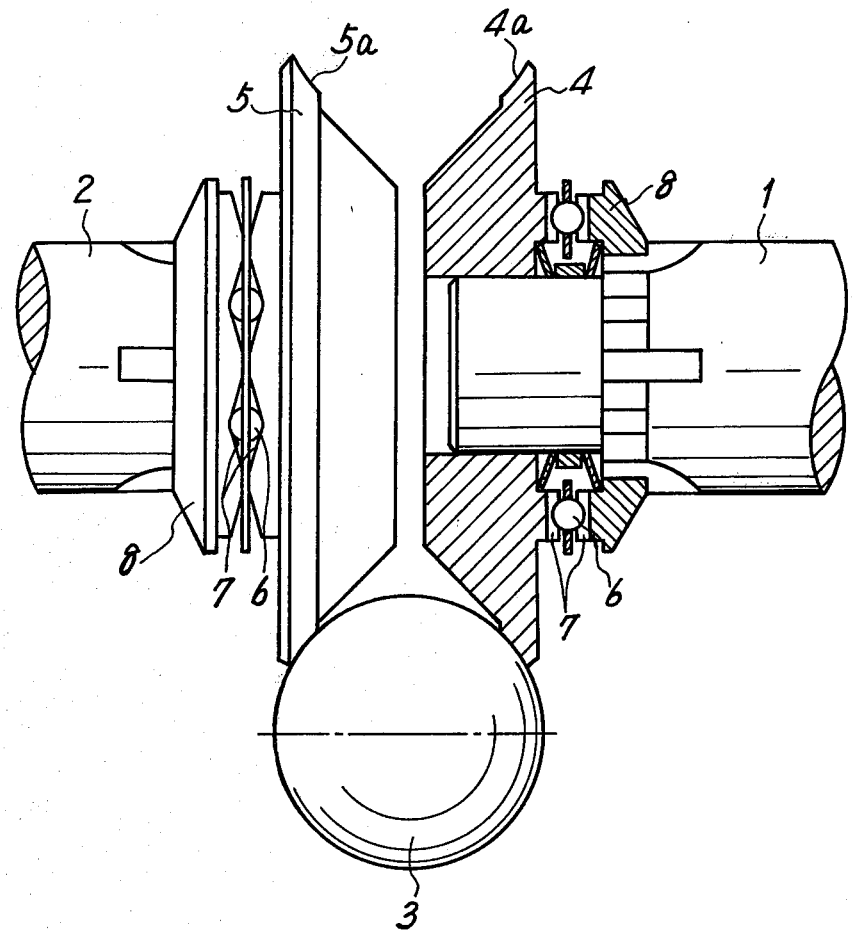
FIG. 1 is a schematic view of a prior art speed converter.
Figure 2:
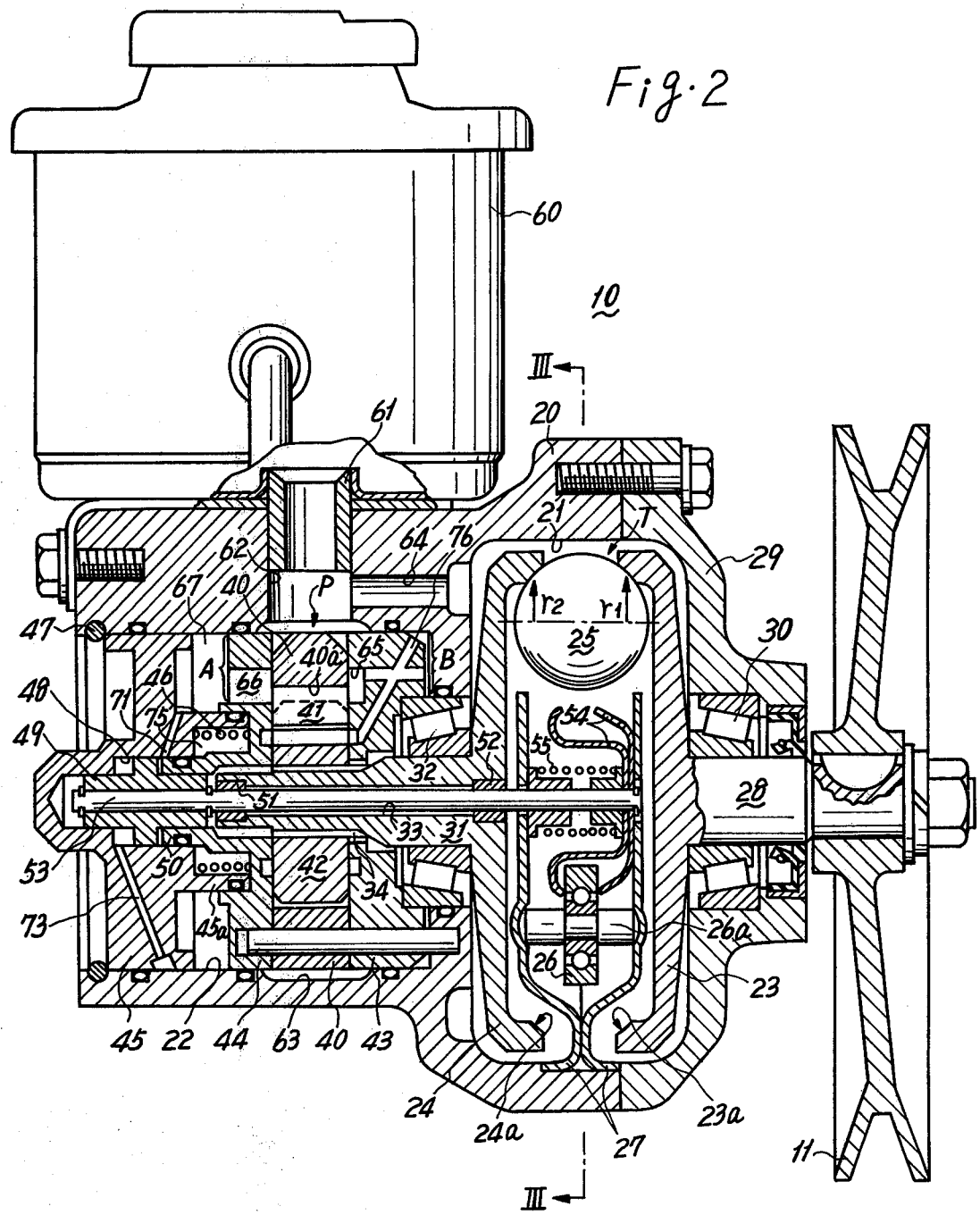
FIG. 2 is a sectional view of a pump device incorporating a continuously variable speed converter according to the present invention.

Referring now the drawings, wherein like reference numerals designate like or corresponding parts throughout the several views, and particularly to FIG. 2 thereof, there is shown an embodiment, in which a stepless or continuously variable speed converter T is incorporated in a pump device 10 and, at its output shaft 31, is directly connected to a pump rotor 42. A main housing 20 is formed, in axial alignment, with an enlarged bore 21 and a bore 22, in which the speed converter T and pump components P are respectively housed. The speed converter T in the enlarged bore 21 comprises a pair of friction discs 23 and 24 formed in inner ends of the input and output shafts 28 and 31 in face-to-face relation with each other, a plurality of balls 25, shown being four in number, rolling in contact with guide ways 23a and 24a of the friction discs 23 and 24, a plurality of retaining rollers 26, also shown being four in number, holding the balls 25 in contact with the guide ways 23a and 24a and being capable of tilting the rotational axis of each of the balls 25 in each plane, including the axis of the input shaft 28, and a retaining case 27 pivotably retaining support shafts 26a of the rollers 26. The input shaft 28, protruding from the friction disc 23, is rotatably carried through a bearing 30 by an end cover 29 secured to one end of the main housing 20, being restrained from axial movement. The output shaft 31, protruding from the other friction disc 24, is extended into the bore 22 containing the pump components P and is rotatably carried by the main housing 20 through a bearing 32, being allowed axial movement. A pulley 11 is keyed on an outer end of the input shaft 28 and is driven via a V-belt by a drive pulley keyed on an engine rotational shaft, not shown. The output shaft 31 is formed with a through bore 33 along its longitudinal axis, as well as with a spline 34 as its outer surface.

The pump components P in the bore 22 comprise a pump casing 40 having an internal cam bore 40a, a pump rotor 42 mounted on the output shaft 31 through a spline engagement and received in the cam bore 40a, a plurality of radially movable vanes 41 retained by the pump rotor 42 and urged to contact with the internal surface of the cam bore 40a, and side plates 43 and 44 held in contact, respectively, with both side surfaces of the pump casing 40 and the pump rotor 42 disposed therebetween. A cap member 45 for closing the open end of the bore 22 is also contained within the main housing 20, with a pre-loaded spring 46 being interposed between itself and the side plate 44, and is prevented by means of a snap ring 47 from slipping off. A cylinder 48 containing a piston 49 is formed in the cap member 45 in axial alignment with the output shaft 31. The inward open end of the cylinder 48 snugly receives a cylindrical sleeve 50 protruding from the side plate 44 so as to be closed thereby. A cylindrical sleeve 45a, protruding from the cap member 45, is fitted into the side plate 44 to define a cavity 75, into which atmospheric air is introduced. The piston 49 is connected to one end of a rod 53, which is extended into the through hole 33 of the output shaft 31 and which is carried by means of bushings 51 and 52 for rotational and axial movement relative to the output shaft 31. The other end of the rod 53 is inserted into the retaining case 27 and is connected to a forked member 54 engaging both side faces of the retaining rollers 26. A compression spring 55 is interposed between the forked member 54 and the retaining case 27 to urge the forked member 54 toward the right, as viewed in FIG. 2.

Figure 4:
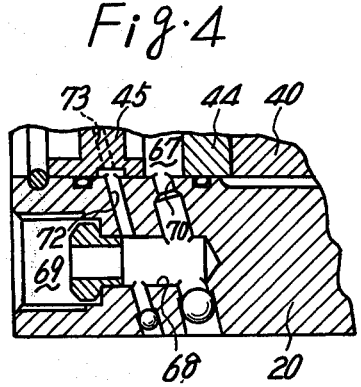
FIG. 4 is a fragmental sectional view illustrative of an outlet passage provided in a main housing of the apparatus.

Fixed on and over the main housing 20 is an oil reservoir 60, from the bottom of which a tubular member 61 is extended to be inserted into a vertical hole 62 of the main housing 20. This tubular member 61 defines a suction passage which leads to a pump suction area via an annular passage 63 formed in the housing 20 around the pump casing 40. A horizontal passage 64 intersecting with the vertical hole 62 allows the oil reservoir 60 to communicate with the enlarged bore 21 containing the speed converter T and admits working oil into the bore 21 to effect lubrication of the parts of the speed converter T. The side plates 44 and 43 are formed, respectively, with an arc through hole 66 and an arc slot 65, which angularly correspond to a pump delivery area, and the hole 66 and the slot 65 are respectively in fluid communication with a pressure chamber 67 defined between the side plate 44 and the cap member 45 and, via a passage 76, with another pressure chamber, not numbered, defined between the side plate 43 and the main housing 20. Fluid under pressure delivered into the pressure chamber 67 is connected to a delivery passage 68 formed in the housing 20, as shown in FIG. 4, so as to be supplied from an outlet 69 to actuators, such as a power steering device, not shown.

Figure 3:
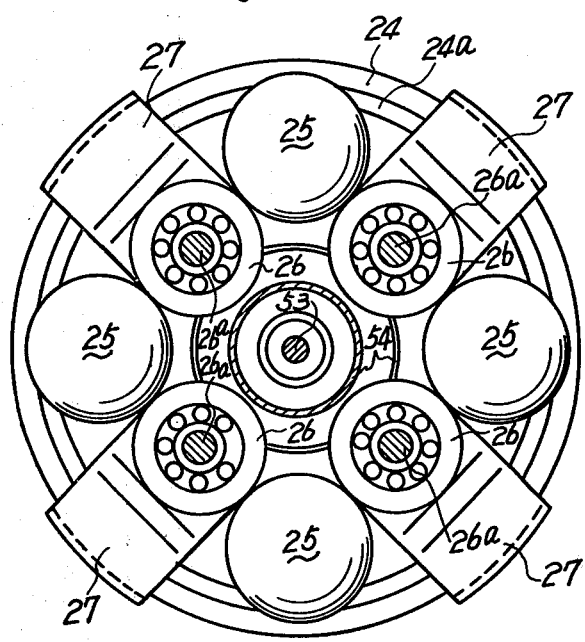
FIG. 3 is a sectional view of the apparatus taken along the line III—III of FIG. 2.

A throttle 70 is formed on the delivery passage 68, and pressurized fluids before and behind the throttle 70 are introduced into the cylinder 48. Specifically, pressurized fluid in the pressure chamber 67 is introduced into the right chamber of the cylinder 48 via a passage 71 and pressurized fluid in the delivery passage 68 behind the throttle 70 is introduced into the left chamber of the cylinder 48 via passages 72 and 73. A pressure force corresponding to the pressure difference between both the pressurized fluids acts on the piston 49 to thereby axially displace the forked member 54, through the rod 53, against the spring 55, and the support shafts 26a of the retaining rollers are thus pivotably moved relative to the retaining case 27. By this, the rotational axes of the balls 25, which are held in contact with the retaining rollers 26 and with the guide ways 23a and 24a of the friction discs 23 and 24, as shown in FIG. 3, are angularly tilted in respective planes, each including the axis of the input shaft 28, and the output/input speed ratio is automatically controlled to maintain constant the difference between the pressures of fluids before and behind the throttle 70, so that pressurized fluid may be delivered from the outlet 69 approximately at a predetermined flow rate.

The side plates 43 and 44 are pressured toward each other since they receive pump-delivered pressurized fluid at side surfaces thereof which are on the opposite side with respect to the other side surfaces being in contact with the pump rotor 42. Since the pressure receiving effective area A of the side plate 44 is designed to be larger than the pressure receiving area B of the side plate 43, a differential force, depending on the difference between the areas A and B, is exerted on the side plate 44, which thus pressures the side plate 43 toward the right, as viewed in FIG. 2, through the casing 40. This differential force is further exerted on the output shaft 31 and the friction disc 24 through the bearing 32, which is in abutting engagement with side plate 43, so as to thereby generate contact pressure between the balls 25 and the guide ways 23a and 24a of the discs 23 and 24. Pre-load contact pressure is generated by means of the spring 46 pressuring the side plate 44. Accordingly, in the situation where no load is acting on the pump, such pre-load contact pressure of the spring 46 effectively serves to transmit rotation of the input shaft 28 to the output shaft 31. Since the pump driving torque in this situation is small, even a weak contact pressure to the guide ways 23a and 24a is sufficient to prevent slip. When the load to the pump is increased, however, the pressure force of fluid against the side plate 44 is strengthened in proportion to the pump load, whereby power transmission may be performed in adaptation to the driving torque required by the pump.

Figure 5:
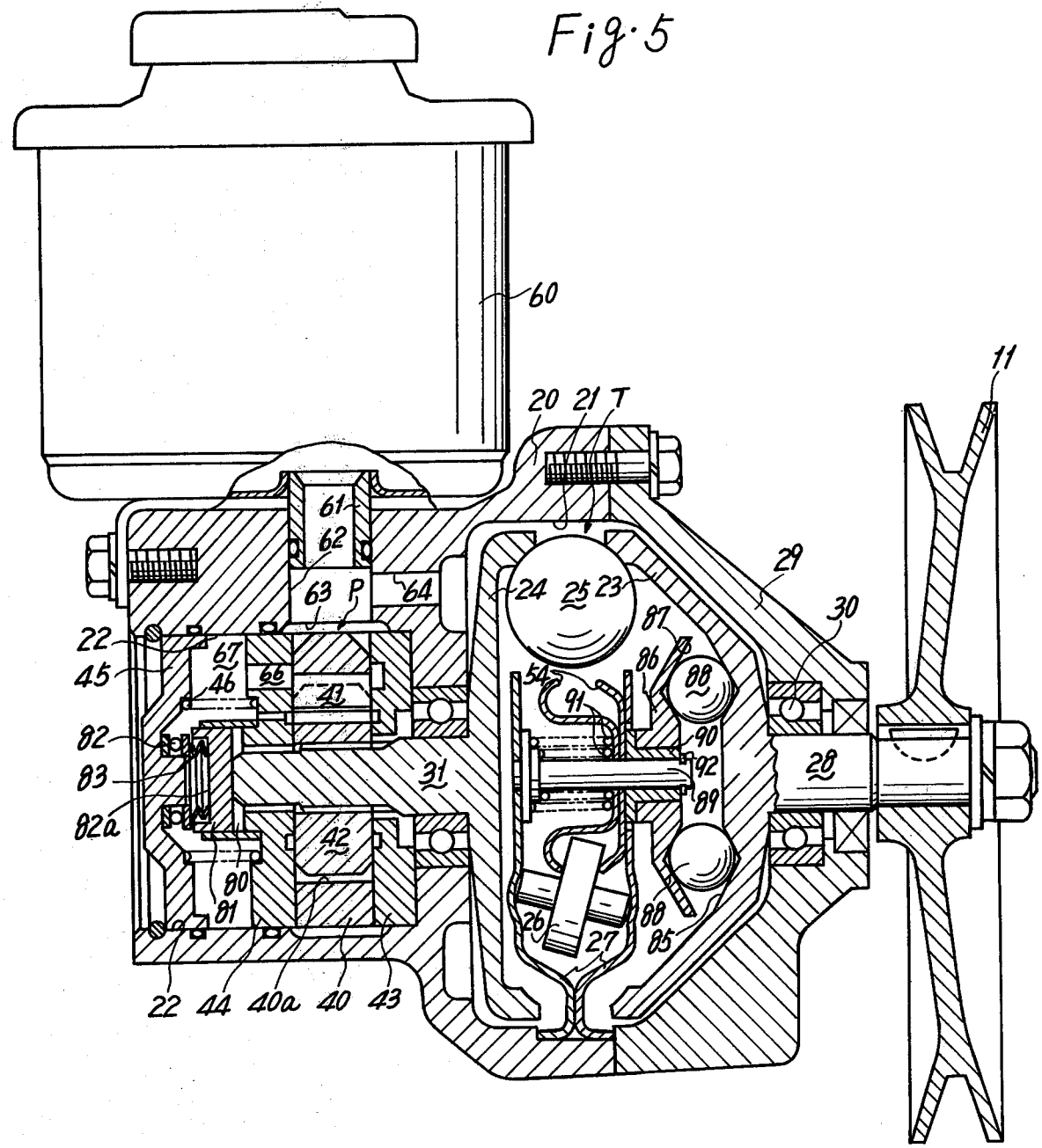
FIG. 5 is a sectional view of another embodiment of the apparatus according to the present invention.

FIG. 5 is illustrative of another embodiment which is different from the foregoing embodiment in that a piston 81 is provided to apply on the outer end of the output shaft 31 a pressure force corresponding to the pump load, and in that a centrifugal governor is employed as a control means of the output/input speed ratio. Description will hereinafter be made mainly with the difference in construction between the embodiments. The pressure chamber 67 is defined between the cap member 45 closing the open end of the main housing 20 and the side plate 44, and a cylinder 80 opening into the pressure chamber 67 is formed at the outer side of the side plate 44 in axial alignment with the pump rotor 42. The outer end of the output shaft 31 is extended into the cylinder 80, within which the piston 81 is snugly contained in abutting engagement with the outer end of the shaft 31. Between the piston 81 and the cap member 45 there are interposed a set of washer springs 83 and a thrust bearing 82, the former being in a compressed state. Pressurized fluid delivered into the pressure chamber 67 acts on the side surface 82a of the piston 81 receiving the washer springs 83. Accordingly, contact force to every rotational friction surface or portion of the speed converter T depends upon the washer springs 83 when no load is acting on the pump, while it depends upon, in addition to the washer springs 83, a pressure of fluid pumped into the pressure chamber 67 when load to the pump is increased. Thus, the contact force is automatically controlled to prevent slip at every rotational friction portion, whereby power transmission may be performed reliably in adaptation to the load of the pump.

Further, the centrifugal governor, acting as a control means of the output/input speed ratio, comprises an annular V-groove 85 formed on the inner side surface of the friction disc 23, a guide disc 86 formed with another annular V-groove 87 in face-to-face relation with the groove 85 and being capable of axially moving the forked member 54 engaging the rollers 26, and a plurality of balls 88 disposed between both the V-grooves 85 and 87. The guide disc 86 is rotatably carried on a bearing bushing 90, which is supported on a pilot rod 89 for axial movement therealong. The pilot rod 89 is secured at its one end to the retaining case 27 in axial alignment with the input shaft 28. A snap ring 92 is provided on the other end of the pilot rod 89 to prevent the bearing bushing 90 from falling out. A compression spring 91, having a nonlinear characteristic of stress, is interposed in compressed state between the forked member 54 and a flange portion of the pilot rod 89 so as to pressure the forked member 54 upon the end face of the bearing bushing 90. With rotation of the input shaft 28, the balls 88 are rotated together with the guide disc 86 and, under the action of centrifugal force, are moved radially of the guide disc 86 to axially displace the same. The guide disc 86 compresses the spring 91 and moves the forked member 54 to a position where it balances the force of the spring 91. Consequently, the support shafts 26a of the retaining rollers 26 are pivoted, which results in angularly tilting the rotational axes of the balls 25 to control the output/input speed ratio. Therefore, the rotational speed of the output shaft 31 can be maintained at a predetermined value regardless of any changes in the rotational speed of the input shaft 28, whereby pressurized fluid can be delivered from the pump at a predetermined flow rate.

Figure 6:
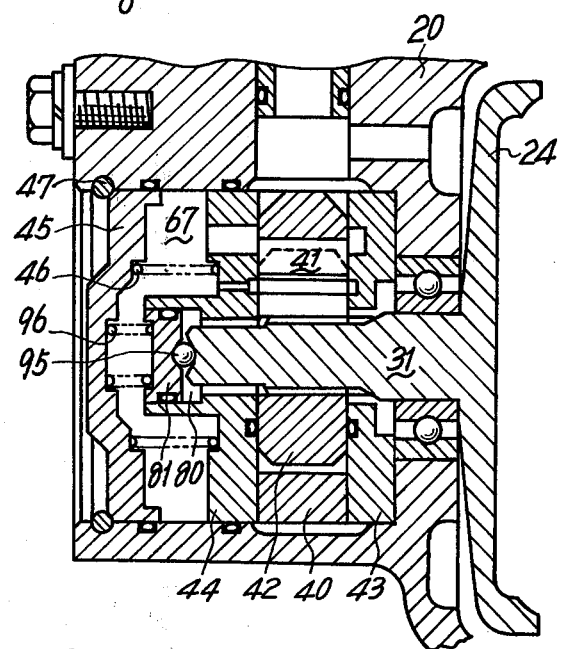
FIG. 6 is a fragmental sectional view of still another embodiment of the apparatus according to the invention.

FIG. 6 is illustrative of an alternative embodiment of that illustrated in FIG. 5. An anti-friction ball 95 is provided between the outer end of the output shaft 31 and the piston 81, and a pre-loaded spring 96 is interposed between the piston 81 and the cap member 45. In this particular embodiment, since no relative rotation occurs between cylinder 80 and the piston 81, reliable sealing therebetween may be achieved.

Figure 7:
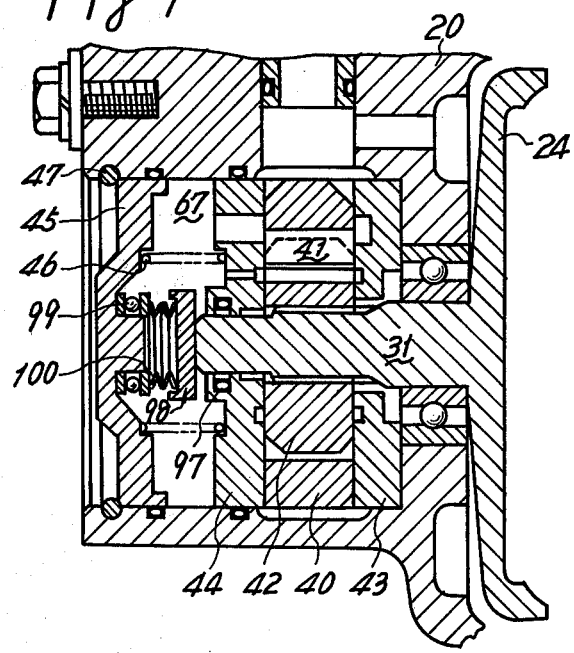
FIG. 7 is a fragmental sectional view of a further embodiment of the apparatus according to the invention.

Referring now to FIG. 7, there is shown a further embodiment, in which elimination of the above-noted piston 81 allows the pump loaded pressure to directly act on the outer end of the output shaft 31. Between the output shaft 31 and the side plate 44, an O-ring seal 97 is disposed to prevent leakage therebetween. Further, a set of washer springs 100, together with a thrust bearing 99, are interposed between the cap member 45 and a spring shoe 98, which is in abutting engagement with the outer end of the output shaft 31, so as to apply pre-loaded contact force on the output shaft 31.

As described above, a speed converter according to the present invention is arranged to receive at every friction engagement portion a contact force which corresponds to the pressure of the fluid from the pump driven by the output shaft. Because of the contact force generated in adaptation to the driving power to be transmitted by the speed converter, not only can wear at the friction engagement portion be decreased, but reliable power transmisson can also be attained. Further, in addition to an advantage that optimum contact force can be generated using the sole pressuring means, whether the output/input speed ratio is more than 1 or less than 1, the speed converter can be exact and reliable in operation for a long life, since it is simple in construction and is freed from wear-caused deterioration in function.

Obviously many modifications and variations of the present invention are possible in light of these teachings. It is therefore to be understood that within the scope of the appended claims, the present invention may be practiced otherwise than as specifically described herein.

What is claimed as new and desired to be secured by letters patent of the United States is:

1. A continuously variable speed converter comprising:
   a main housing;
   input and output shafts rotatably carried in said main housing in axial alignment with each other;
   a pair of friction discs respectively provided on said input and output shafts and formed with opposing guide ways;
   a plurality of balls held in contact with said guide ways of said friction discs;
   holding and adjusting means for holding said plurality of balls in contact with said guide ways and for angularly tilting the rotational axis of each of said balls in each plane, including the axis of said input shaft, so as to adjust the output/input speed ratio;
   a pump casing received within a pressure chamber, formed in said main housing, for movement in an axial direction of said output shaft and having an internal cam bore;
   a pump rotor received within said internal cam bore and mounted on said output shaft for being driven thereby so as to deliver pressurized fluid into said pressure chamber; and
   first and second side plates held in contact with both sides of said pump casing and rotor and formed at respective outer sides with first and second areas for receiving pressure of fluid delivered into said pressure chamber, said first and second areas being different from each other in effective area so as to axially pressure said output shaft toward said input shaft.

2. A continuously variable speed converter as claimed in claim 1, further comprising a pre-loaded spring interposed between said main housing and one of said first and second side plates for applying a pre-load on the same so as to thereby axially pressure said output shaft toward said input shaft.

3. A continuously variable speed converter as claimed in claim 2, further comprising a bearing rotatably carrying said output shaft in said main housing and being in abutting engagement with said one of said first and second side plates so as to transmit to said output shaft the pressure force acting on said pump casing and said first and second side plates.

4. A continuously variable speed converter as claimed in claim 3, wherein said holding and adjusting means comprises:
   a retaining member fixedly provided between said pair of said friction discs and in said main housing;
   a plurality of pivot shafts carried by said retaining member for pivotal movement in respective planes, each including the axis of said output shaft;
   a plurality of rollers respectively carried on said plurality of said pivot shafts and cooperating with one another to hold each of said balls in contact with said guide ways;
   a movable member for angularly tilting said plurality of said pivot shafts in each of said planes; and
   an actuator responsive to fluid delivered into said main housing so as to operate said movable member.

5. A continuously variable speed converter as claimed in claim 4, further comprising a throttle provided on an outlet passage which is formed for externally delivering pressurized fluid generated by the rotation of said pump rotor, said actuator being responsive to fluids which are delivered respectively through and not through said throttle.

6. A continuously variable speed converter comprising:
   a main housing;
   input and output shafts rotatably carried in said main housing in axial alignment with each other;
   a pair of friction discs respectively provided on said input and output shafts and formed with opposing guide ways;
   a plurality of balls held in contact with said guide ways of said friction discs;
   holding and adjusting means for holding said plurality of balls in contact with said guide ways and for angularly tilting the rotational axis of each of said balls in each plane, including the axis of said input shaft, so as to adjust the output/input speed ratio;
   a pump casing received within said main housing and having an internal cam bore;
   a pump rotor mounted on said output shaft for rotation together therewith and received within said internal cam bore;
   first and second side plates held in contact with both sides of said pump casing and rotor;
   a hollow cylinder protruded from one of said side plates; and
   a piston received in said hollow cylinder and responsive to fluid delivered into said main housing so as to pressure an outer end of said output shaft.

7. A continuously variable speed converter as claimed in claim 6, wherein said holding and adjusting means comprises:
   a retaining member fixedly provided between said pair of friction discs and in said main housing;
   a plurality of pivot shafts carried by said retaining member for pivotal movement in respective planes, each including the axis of said input shaft;
   a plurality of rollers respectively carried on said plurality of said pivot shafts and cooperating with one another to hold each of said balls in contact with said guide ways;
   a movable member for angularly tilting said plurality of said pivot shafts in said respective planes; and
   a centrifugal governor operatively connected with said movable member for operating the same under the action of centrifugal force.

8. A continuously variable speed converter as claimed in claim 7, wherein said centrifugal governor comprises:
   a pilot rod fixedly provided on said retaining member in axial alignment with said input shaft;
   a guide disc carried on said pilot rod for rotational and axial movement and capable of operating said movable member when axially operated;
   a plurality of balls interposed between said guide disc and one of said friction discs provided on said input shaft and radially movable under the action of centrifugal force when said input shaft is rotated; and
   a spring provided for urging said guide disc toward said one of said friction discs.

9. A continuously variable speed converter as claimed in claim 8, further comprising a pre-loaded spring interposed between said main housing and said piston, so as to apply a pre-load on the same to thereby axially pressure said output shaft toward said input shaft.

10. A continuously variable speed converter as claimed in claim 9, further comprising a thrust bearing interposed between said main housing and said pre-loaded spring.

11. A continuously variable speed converter as claimed in claim 9, further comprising an anti-friction ball interposed between said piston and said outer end of said output shaft.

12. A continuously variable speed converter comprising:
   a main housing;
   input and output shafts rotatably carried in said main housing in axial alignment with each other;
   a pair of friction discs respectively provided on said input and output shafts and formed with opposing guide ways;
   a plurality of balls held in contact with said guide ways of said friction discs;
   holding and adjusting means for holding said plurality of balls in contact with said guide ways and for angularly tilting the rotational axis of each of said balls in each plane, including the axis of said input shaft, so as to adjust the output/input speed ratio;
   a pump casing received within said main housing and having an internal cam bore;
   a pump rotor mounted on said output shaft for rotation together therewith and received within said internal cam bore;
   first and second side plates held in contact with both sides of said pump casing and rotor;
   a spring shoe held in contact with an outer end of said output shaft and responsive to fluid delivered into said main housing for axially pressuring said output shaft toward said input shaft, and
   a pre-loaded spring interposed between said housing and said spring shoe for applying a pre-load to the same so as to thereby axially pressure said output shaft toward said input shaft.

13. A continuously variable speed converter as claimed in claim 12, further comprising a thrust bearing interposed between said main housing and said pre-loaded spring.

* * * * *